(12) United States Patent
Gustafson et al.

(10) Patent No.: US 7,957,552 B2
(45) Date of Patent: **\*Jun. 7, 2011**

(54) OPTIMIZED DIGITAL WATERMARKING FUNCTIONS FOR STREAMING DATA

(75) Inventors: Ammon E. Gustafson, Portland, OR (US); Robert G. Lyons, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 199 days.

This patent is subject to a terminal disclaimer.

(21) Appl. No.: 12/356,489

(22) Filed: Jan. 20, 2009

(65) Prior Publication Data

US 2010/0014705 A1    Jan. 21, 2010

Related U.S. Application Data

(63) Continuation of application No. 11/009,694, filed on Dec. 10, 2004, now Pat. No. 7,480,393, which is a continuation-in-part of application No. 10/996,138, filed on Nov. 19, 2004, now abandoned.

(60) Provisional application No. 60/523,748, filed on Nov. 19, 2003.

(51) Int. Cl.
*G06K 9/00* (2006.01)
*H04L 9/32* (2006.01)

(52) U.S. Cl. ........................................ 382/100; 713/176

(58) Field of Classification Search .................. 382/100, 382/232, 240, 276, 279, 280, 302, 303; 713/176, 713/179; 380/51, 54, 210, 252, 287; 283/42, 283/74–81, 93, 101, 901, 902; 370/522–529; 358/3.28
See application file for complete search history.

(56) References Cited

U.S. PATENT DOCUMENTS

| 252,524 A | 1/1882 | Sagendorph |
| 1,210,375 A | 12/1916 | Decker |
| 3,014,818 A | 12/1961 | Campbell |
| 3,308,488 A | 3/1967 | Schoonman |
| 3,385,915 A | 5/1968 | Hamling |
| 3,663,182 A | 5/1972 | Hamling |
| 3,769,060 A | 10/1973 | Ida et al. |
| 3,821,163 A | 6/1974 | Spivack |

(Continued)

FOREIGN PATENT DOCUMENTS

DE     44 03 016      8/1995

(Continued)

OTHER PUBLICATIONS

Debes, et al., "Watermarking Scheme for Large Images Using Parallel Processing," Proc. of SPIE vol. 4314 (2001), pp. 26-34.

(Continued)

*Primary Examiner* — Abolfazl Tabatabai (57) ABSTRACT

A digital watermark detector comprises a memory buffer for receiving an incoming stream of data. The detector includes a registration module for determining registration of embedded data in blocks of the incoming stream of data, and logic for re-using the registration for subsequent blocks of the incoming stream of data to detect machine readable signals. Another digital watermark detector comprises a message reader for extracting message estimates from blocks of media signal data and a decoder for combining the extracted message estimates and decoding a message from the combined message elements. Another digital watermark detector comprises a memory buffer and pipelined watermark processor segments. The segments each perform a different watermark detector operation. These segments concurrently operate on different data segments of the block of data in a processing pipeline.

21 Claims, 5 Drawing Sheets

U.S. PATENT DOCUMENTS

| | | | |
|---|---|---|---|
| 3,860,529 A | 1/1975 | Hamling | |
| 4,072,784 A | 2/1978 | Cirino et al. | |
| 4,103,450 A | 8/1978 | Whitcomb | |
| 4,115,422 A | 9/1978 | Welch et al. | |
| 4,174,418 A | 11/1979 | Welch et al. | |
| 4,201,825 A | 5/1980 | Ebneth | |
| 4,219,602 A | 8/1980 | Conklin | |
| 4,278,435 A | 7/1981 | Ebneth | |
| 4,291,086 A | 9/1981 | Auten | |
| 4,292,882 A | 10/1981 | Clausen | |
| 4,317,856 A | 3/1982 | Huthwelker et al. | |
| 4,366,202 A | 12/1982 | Borovsky | |
| 4,390,585 A | 6/1983 | Holden | |
| 4,525,410 A | 6/1985 | Hagiwara et al. | |
| 4,666,940 A | 5/1987 | Bischoff et al. | |
| 4,675,014 A | 6/1987 | Sustmann et al. | |
| 4,710,184 A | 12/1987 | Ehret | |
| 4,769,275 A | 9/1988 | Inagaki et al. | |
| 4,853,019 A | 8/1989 | Blank et al. | |
| 4,900,618 A | 2/1990 | O'Connor et al. | |
| 4,900,765 A | 2/1990 | Murabayashi et al. | |
| 4,983,573 A | 1/1991 | Bolt et al. | |
| 4,999,240 A | 3/1991 | Brotz | |
| 5,009,946 A | 4/1991 | Hatomoto et al. | |
| 5,017,420 A | 5/1991 | Marikar et al. | |
| 5,024,875 A | 6/1991 | Hill et al. | |
| 5,066,538 A | 11/1991 | Huykman | |
| 5,143,769 A | 9/1992 | Moriya et al. | |
| 5,175,040 A | 12/1992 | Harpell et al. | |
| 5,200,256 A | 4/1993 | Dunbar | |
| 5,217,626 A | 6/1993 | Yahya et al. | |
| 5,227,365 A | 7/1993 | Van den Sype | |
| 5,254,134 A | 10/1993 | Zhao et al. | |
| 5,269,973 A | 12/1993 | Takahashi et al. | |
| 5,316,837 A | 5/1994 | Cohen | |
| 5,316,846 A | 5/1994 | Pinsky et al. | |
| 5,370,934 A | 12/1994 | Burch et al. | |
| 5,399,425 A | 3/1995 | Burch | |
| 5,405,644 A | 4/1995 | Ohsumi et al. | |
| 5,407,743 A | 4/1995 | Clough et al. | |
| 5,411,795 A | 5/1995 | Silverman | |
| 5,458,906 A | 10/1995 | Liang | |
| 5,492,882 A | 2/1996 | Doughty et al. | |
| 5,518,812 A | 5/1996 | Mitchnick et al. | |
| 5,547,610 A | 8/1996 | Mortensen | |
| 5,549,972 A | 8/1996 | Hsu et al. | |
| 5,636,292 A | 6/1997 | Rhoads | |
| 5,744,222 A | 4/1998 | Sugihara | |
| 5,848,592 A | 12/1998 | Sibley | |
| 5,849,235 A | 12/1998 | Sassa et al. | |
| 5,856,248 A | 1/1999 | Weinberg | |
| 5,869,412 A | 2/1999 | Yenni et al. | |
| 5,871,816 A | 2/1999 | Tal | |
| 5,881,353 A | 3/1999 | Kamigata et al. | |
| 5,904,854 A | 5/1999 | Shmidt et al. | |
| 5,939,340 A | 8/1999 | Gabbay | |
| 5,960,081 A | 9/1999 | Vynne et al. | |
| 5,981,066 A | 11/1999 | Gabbay | |
| 6,013,275 A | 1/2000 | Konagaya et al. | |
| 6,122,403 A * | 9/2000 | Rhoads | 382/233 |
| 6,124,221 A | 9/2000 | Gabbay | |
| 6,209,094 B1 * | 3/2001 | Levine et al. | 713/176 |
| 6,374,336 B1 | 4/2002 | Peters et al. | |
| 6,383,273 B1 | 5/2002 | Kepner et al. | |
| 6,389,421 B1 | 5/2002 | Hawkins et al. | |
| 6,394,281 B2 | 5/2002 | Ritland et al. | |
| 6,411,392 B1 | 6/2002 | Bender et al. | |
| 6,470,090 B2 * | 10/2002 | Oami et al. | 382/100 |
| 6,473,516 B1 * | 10/2002 | Kawaguchi et al. | 382/100 |
| 6,482,424 B1 | 11/2002 | Gabbay | |
| 6,542,541 B1 | 4/2003 | Luna et al. | |
| 6,556,688 B1 * | 4/2003 | Ratnakar | 382/100 |
| 6,563,935 B1 | 5/2003 | Echizen et al. | |
| 6,611,830 B2 | 8/2003 | Shinoda et al. | |
| 6,614,914 B1 | 9/2003 | Rhoads et al. | |
| 6,674,876 B1 | 1/2004 | Hannigan et al. | |
| 6,700,990 B1 | 3/2004 | Rhoads | |
| 6,724,914 B2 | 4/2004 | Brundage et al. | |
| 6,871,180 B1 | 3/2005 | Neuhauser et al. | |
| 6,952,485 B1 | 10/2005 | Davidson et al. | |
| 6,971,011 B1 | 11/2005 | Maes | |
| 6,983,051 B1 | 1/2006 | Rhoads | |
| 6,996,249 B2 * | 2/2006 | Miller et al. | 382/100 |
| 7,466,840 B2 | 12/2008 | Rhoads | |
| 7,536,555 B2 | 5/2009 | Rhoads | |
| 7,567,686 B2 | 7/2009 | Rhoads | |
| 7,672,477 B2 | 3/2010 | Rhoads | |
| 7,751,588 B2 | 7/2010 | Rhoads | |
| 7,756,290 B2 | 7/2010 | Rhoads | |
| 2001/0026616 A1 | 10/2001 | Tanaka | |
| 2002/0090111 A1 | 7/2002 | Fukushima et al. | |
| 2002/0120849 A1 | 8/2002 | McKinley et al. | |
| 2002/0140857 A1 | 10/2002 | Limaye | |
| 2003/0002672 A1 | 1/2003 | Beekmans et al. | |
| 2003/0081777 A1 | 5/2003 | Brondijk et al. | |
| 2005/0177361 A1 | 8/2005 | Srinivasan | |

FOREIGN PATENT DOCUMENTS

| | | |
|---|---|---|
| EP | 0 116 825 | 8/1984 |
| EP | 0 253 653 | 1/1988 |
| EP | 0 427 858 | 5/1991 |
| FR | 1499358 | 9/1967 |
| FR | 2764518 | 6/1997 |
| GB | 0 415 213 | 8/1934 |
| GB | 1 382 820 | 12/1971 |
| JP | 63-088007 | 4/1988 |
| JP | 01-046465 | 2/1989 |
| JP | 01-246204 | 10/1989 |
| JP | 02-161954 | 6/1990 |
| JP | 03-113011 | 5/1991 |
| JP | 06-285772 | 5/1996 |
| WO | WO-94/15463 | 7/1994 |
| WO | WO-98/06508 | 2/1998 |
| WO | WO-98/06509 | 2/1998 |
| WO | WO-00/75415 | 12/2000 |
| WO | WO-01/74166 | 10/2001 |
| WO | WO-01/81671 | 11/2001 |
| WO | WO-02/065753 | 8/2002 |

OTHER PUBLICATIONS

U.S. Appl. No. 10/053,488 Final Rejection mailed Dec. 4, 2007 and Appeal Brief filed Jul. 7, 2008.

U.S. Patent Application as filed, U.S. Appl. No. 10/240,993, filed Oct. 4, 2004.

U.S. Patent Application as filed, U.S. Appl. No. 10/339,886, filed Jan. 10, 2003.

U.S. Patent Application as filed, U.S. Appl. No. 10/405,408, filed Apr. 1, 2003.

U.S. Patent Application as filed, U.S. Appl. No. 10/371,491, filed Feb. 21, 2003.

U.S. Patent Application as filed, U.S. Appl. No. 10/757,786, filed Jan. 13, 2004.

U.S. Patent Application as filed, U.S. Appl. No. 10/756,849, filed Jan. 13, 2004.

U.S. Patent Application as filed, U.S. Appl. No. 10/133,691, filed Apr. 24, 2002.

U.S. Patent Application as filed, U.S. Appl. No. 10/752,938, filed Jan. 6, 2004.

U.S. Patent Application as filed, U.S. Appl. No. 10/772,890, filed Feb. 4, 2004.

"Encyclopedia of Polymer Science and Technology," John Wiley and Sons, Inc., (1968) vol. 8, pp. 651-666 and vol. 9, pp. 580-598.

Marino, A. et al., "Electrochemical Properties of Silver-Nylon Fabrics," J. Electrochem. Soc. (1985) vol. 132, No. 1, pp. 68-72.

Notice of Allowance on U.S. Appl. No. 11/009,694, mailed Sep. 9, 2008.

Notice of Allowance on U.S. Appl. No. 11/009,694, mailed Jun. 6, 2008.

Notice of Allowance on U.S. Appl. No. 11/009,694, mailed Jan. 29, 2008.

Notice of Allowance on U.S. Appl. No. 11/009,694, mailed Sep. 28, 2007.

* cited by examiner

OPTIMIZED DIGITAL WATERMARKING FUNCTIONS FOR STREAMING DATA

RELATED APPLICATION DATA

This application is a continuation of U.S. patent application Ser. No. 11/009,694, filed Dec. 10, 2004 (now U.S. Pat. No. 7,480,393), which is a continuation in part of U.S. patent application Ser. No. 10/996,138, filed Nov. 19, 2004, which claims the benefit of U.S. Provisional Application 60/523,748, filed Nov. 19, 2003, which are hereby incorporated by reference.

TECHNICAL FIELD

The invention relates to digital watermarking, and in particular, optimized methods for detecting and extracting embedded digital data from a media data stream.

BACKGROUND AND SUMMARY

Digital watermarking is a process for modifying physical or electronic media to embed a hidden machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by subtly altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's U.S. Pat. Nos. 6,122,403 and 6,614,914, which are hereby incorporated by reference.

There are a number of uses of digital watermarking where it is beneficial to implement at least some portion of the embedding or reading process in hardware and firmware. Some examples include the use of an embedder or reader in cameras, cell phones, portable media players, office equipment (e.g., printers, scanners, fax machines, copiers, etc.). The complexity and memory requirements of digital watermark encoders/decoders present a number of design challenges in implementing them in hardware.

Presenting further design constraints, certain hardware applications of digital watermarking make only a small portion of a media signal available at one time for encoding/decoding operations. For example, the streaming flow of image data in office equipment hardware only makes small sections of an image available at a time (e.g., a group of scan lines of an image, sometimes referred to as a band).

This disclosure describes methods and associated hardware for implementing digital watermarking functions. A digital watermark detector comprises a memory buffer for receiving an incoming stream of data. The detector includes a registration module for determining registration of embedded data in blocks of the incoming stream of data, and logic for re-using the registration for subsequent blocks of the incoming stream of data to detect machine readable signals.

Another digital watermark detector comprises a message reader for extracting message estimates from blocks of media signal data and a decoder for combining the extracted message estimates and decoding a message from the combined message elements.

Another digital watermark detector comprises a memory buffer and pipelined watermark processor segments. The segments each perform a different watermark detector operation. These segments concurrently operate on different data segments of the block of data in a processing pipeline.

Another method uses registration and message decoding estimates for some blocks in a signal to limit digital watermark processing in other blocks. These estimates can limit the range of geometric registration processing, avoid redundant computation, and/or provide a more accurate detection by accumulating decoded information across several blocks.

In another aspect of the invention, a digital watermark detector comprises a memory buffer for a block of data and pipelined watermark processor segments. The segments each perform a different watermark detector operation. These segments concurrently operate on different data segments of the block of data in a processing pipeline. One embodiment employs pipelined processors for setting up data for subsequent detecting stages, such as pipelined color conversion, re-sampling, pre-filtering and frequency domain transforms. Alternative embodiments pipeline data transformations, correlation operations (e.g., matched filter operations) etc. Data flows through the processing pipeline until it reaches a critical point. At stages before the critical point, data may be dropped as not likely to include digital watermark data. This pruning of data helps reduce un-needed processing and/or false positives of watermark detection.

Further features will become apparent with reference to the following detailed description and accompanying drawings.

DETAILED DESCRIPTION

Introduction

In this document, we illustrate methods and related hardware for digital watermarking functions. These methods are particularly discussed in the context of block based watermarking of images for hardware implementations. However, some of these methods can be extended to different data types and processing environments.

In the block based digital watermarking methods detailed below, instances of a digital watermark signal are redundantly embedded in contiguous blocks of a host image. Detailed examples of these methods are described in more detail in U.S. Pat. Nos. 6,122,403 and 6,614,914. Specific application of digital watermarking to streaming data is described in U.S. Pat. No. 6,952,485, which is hereby incorporated by reference.

The block based approach provides a number of potential advantages as well as challenges in the design of a digital watermark detector. Some advantages are that the block based structure and repetition of the watermark can be used to assist in detection by aggregating detection results across blocks and provide information used in calculating the geometric orientation of the watermark. Also, block based watermark can enable, in certain circumstances, complete detection of a digital watermark, including a multi-symbol variable message carried in the watermark, from a small clip of the watermarked image. Some challenges associated with two dimensional watermark blocks is that some number of pixels need to be at least temporarily stored and analyzed to extract the digital watermark.

Another challenge in block based digital watermarking systems is that the digital watermark is typically not equally detectable in all areas of the image. In some areas, the watermark strength may be stronger, and thus, more detectable, due to the host image characteristics and/or lack of distortion that degrades the watermark. This presents a challenge because processing resources and memory might be wasted attempting to extract a watermark from an area where the signal is weak or degraded.

Streaming Image Data in Bands

We now describe watermark detector functions that operate on a streaming image source. A typical image source in office equipment is a stream of image bands. Each band typically comprises two or more scan lines (horizontal rows) of pixels across a document page. The spatial resolution (e.g., number of data samples or pixels per inch) can vary, but a representative resolution is 300 Dots Per Inch (DPI). Actual spatial resolution of the pixels may be higher or lower.

Since the data is in the form of bands across a page, it is possible to exploit the greater amount of data, and perhaps corresponding greater resolution, in the horizontal dimension. Various ways of exploiting this attribute of streaming image bands are described further below.

Another attribute of the bands that constrains some implementations is that they may not be able to be captured and saved for an entire image (such as a document image being printed or scanned). One reason for this limitation relates to the memory required to buffer an entire page, and circuitry required to process the entire page is not available in lower cost hardware implementations. Further, the time required to read and process data across the page randomly and repeatedly is not available.

Figure 1:
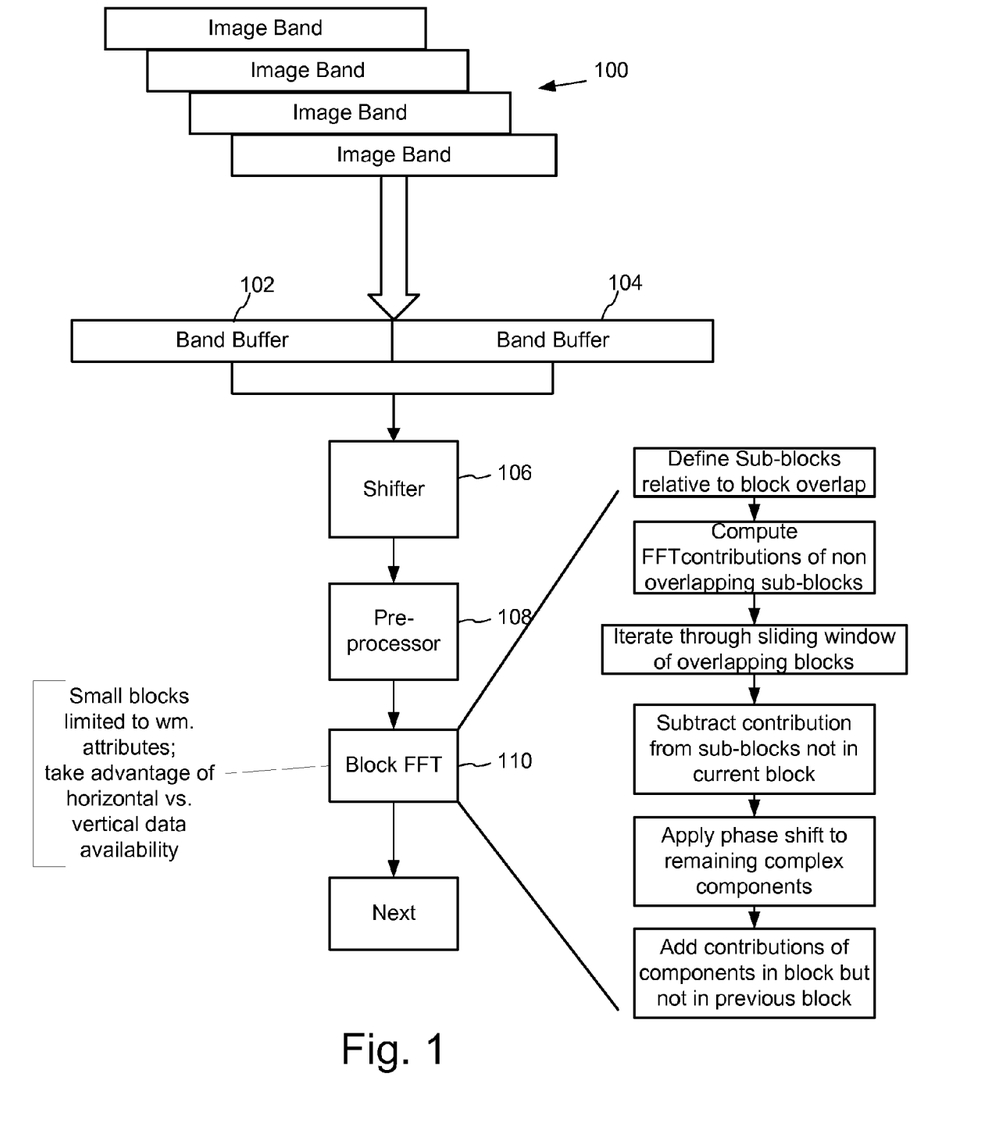
FIG. 1 is a block diagram illustrating an input stage of a digital watermark detector that operates on streaming image data and optimizes frequency transformation calculations.

FIG. 1 shows an example of a cascade of image bands 100 streaming into an initial stage of a digital watermark detector. These bands represent portions of an image being sent to a printer for printing, or alternatively, being scanned from a document being scanned. As these bands arrive, they are buffered in buffers 102, 104. This particular diagram shows a dual buffering approach where one buffer fills, while the watermark detector operates on the other. The watermark detector switches back and forth between the buffers as the data becomes available.

The watermark detector operates on blocks of image pixels within one band. These operations may be performed in parallel or in series. In this particular case, the detector serially operates on blocks of pixels across a band. A shifter 106 shifts across blocks in the band buffer, selecting blocks in series for further processing.

There are some pre-processor 108 operations, such as sampling and color conversion that may be applied at this stage, if not already handled previously. For example, color image data can be converted into luminance or some other color channel for watermark detection.

Next, the watermark detector performs a series of calculations to approximate a spatial to frequency domain transformation of the image data. In this particular case, the transform is a form of block Fast Fourier Transform 110. Generally, this type of frequency transformation is used extensively in a wide variety of watermark detection algorithms to, for example, transform the media data into a form where the digital watermark is detected and extracted, and to implement common detector convolution operations, such as matched filtering, cross correlation, autocorrelation, etc. As such, the optimizations described here are applicable to a variety of digital watermark detection algorithms and embedded signaling protocols.

One particular optimization, as highlighted above, is to take advantage of the level of detail available in the horizontal direction by performing the frequency domain transformation at a higher level of detail in the horizontal direction than the vertical. In this particular implementation, the detector seeks to detect discrete watermark elements in the frequency domain at particular locations. By using more spatial detail in the horizontal direction, the detector can compensate for less detail in the vertical direction to increase the accuracy of detecting watermark signal peaks or other watermark signal attributes at expected locations with in the transformed data.

The higher level of detail can be achieved by using an FFT with a larger dimension in the horizontal vs. vertical direction on image data at a fixed spatial resolution, or by using image data that is at a higher resolution in the horizontal vs. vertical direction. In the first case, the FFT module in the detector is longer in the horizontal vs. vertical direction (e.g., has more points in the horizontal than vertical dimension, such as a 256 by 64 point FFT). This type of FFT processor yields more samples in the frequency domain along the horizontal dimension, enabling better signal separation. This greater resolution in the frequency domain enables the detector to make a more accurate detection, and/or compensate for the potential loss of accuracy in the vertical direction due to the lack of data and corresponding smaller point FFT in the vertical direction.

In the second case, the higher resolution spatial domain data enables more high frequencies to be represented in the frequency domain. This is helpful if the digital watermark is at least partially represented at higher frequencies. If it is not, computational efficiency can be gained by high pass filtering and downsampling to a lower resolution, enabling a smaller and more computationally efficient FFT.

These two techniques can be used together to obtain a frequency representation and corresponding method of processing that provides improved signal detection accuracy in the frequency domain with the lowest computational complexity.

Another optimization is expanded on the right part of FIG. 1. Computationally, the block FFT can be expensive if performed over and over across the image. One way to mitigate this expense is to re-use the data computed for overlapping image blocks. Digital watermark detection operations utilize frequency domain samples computed for overlapping blocks resulting from repeatedly applying a block FFT in sliding window across the image. This process can lead to inefficiencies if implemented in a manner that does not re-use FFT computations previously computed for an overlapping block.

The right hand side of FIG. 1 shows a method of re-using FFT components across the image. In a sliding window approach, the window size corresponds to the size of the FFT, which in turn corresponds to a block of image pixels being transformed into the Fourier domain for a particular step. This window slides across the band in step sizes that are less than the block size, resulting in overlap between adjacent blocks in the sliding window. The overlap can be in both the horizontal and vertical direction, and is typically a factor of the FFT size (e.g., a horizontal step size of 64 for an FFT of length 256 horizontally). The FFT processor defines the size of the sub-block in terms of the size of the overlap (e.g., a 64 sample step size for an overlap between adjacent steps of 64).

As depicted in the diagram, the FFT process need only compute once the contribution of a sub-block to the frequency transform of several blocks in which it is a part. This can be achieved by computing all of the FFT contributions for sub-blocks in parallel, in series or some other arrangement. The point is that the FFT processor need only compute the FFT contribution of a sub-block once, and re-use this contribution for all the blocks in which it falls as the sliding window moves across the band.

For example, as the FFT processor slides across the band for each step, the FFT processor collects the FFT components from sub-blocks in the block that corresponds to the current window. These contributions add together to produce the frequency domain for the current block. To get the next block's frequency transform, the FFT processor subtracts the contributions from sub-blocks that are in a previous block but not in the current block, applies a phase shift to the remaining complex components which accounts for the translation of moving from the previous to the current block, and adds contributions from sub-blocks that are in the current block but not the previous. The FFT processor continues this process for each block across the band.

This approach may use a little more memory, but reduces the number of mathematical operations. It is roughly equivalent to computing the FFTs for all blocks to which a sub-block belongs simultaneously. The FFT processor calculates the sub-block's contribution once, and then applies the appropriate phase shifts and adds the results to the FFT space for each block.

The re-use of FFT calculations may be limited in implementations where a window filtering pre-processes the data before the FFT. Windowing filtering is performed to suppress edge effects at the edges of the blocks of data input to the FFT. One such window filter is a raised cosine filter.

Another optimization that can reduce computational complexity is to adapt the detector calculations such that they operate on the square of the Fourier magnitude data. This avoids the need for more costly square root and divide operations. In this case, the square of the Fourier magnitude is output from the FFT processor.

At this stage, the digital watermark detectors can be specialized further to perform additional detection and extraction operations on the transformed data and the original spatial image data that is buffered for the current band (or set of contiguous bands).

In some cases, the detector needs to compensate for rotation, spatial scaling and translation shifts applied to the watermarked image after the watermark has been embedded. In this case, a geometric registration module computes and compensates for this geometric distortion to ensure accurate watermark detection and to facilitate accurate extraction of a variable multi-bit message carried in the digital watermark.

Figure 2:
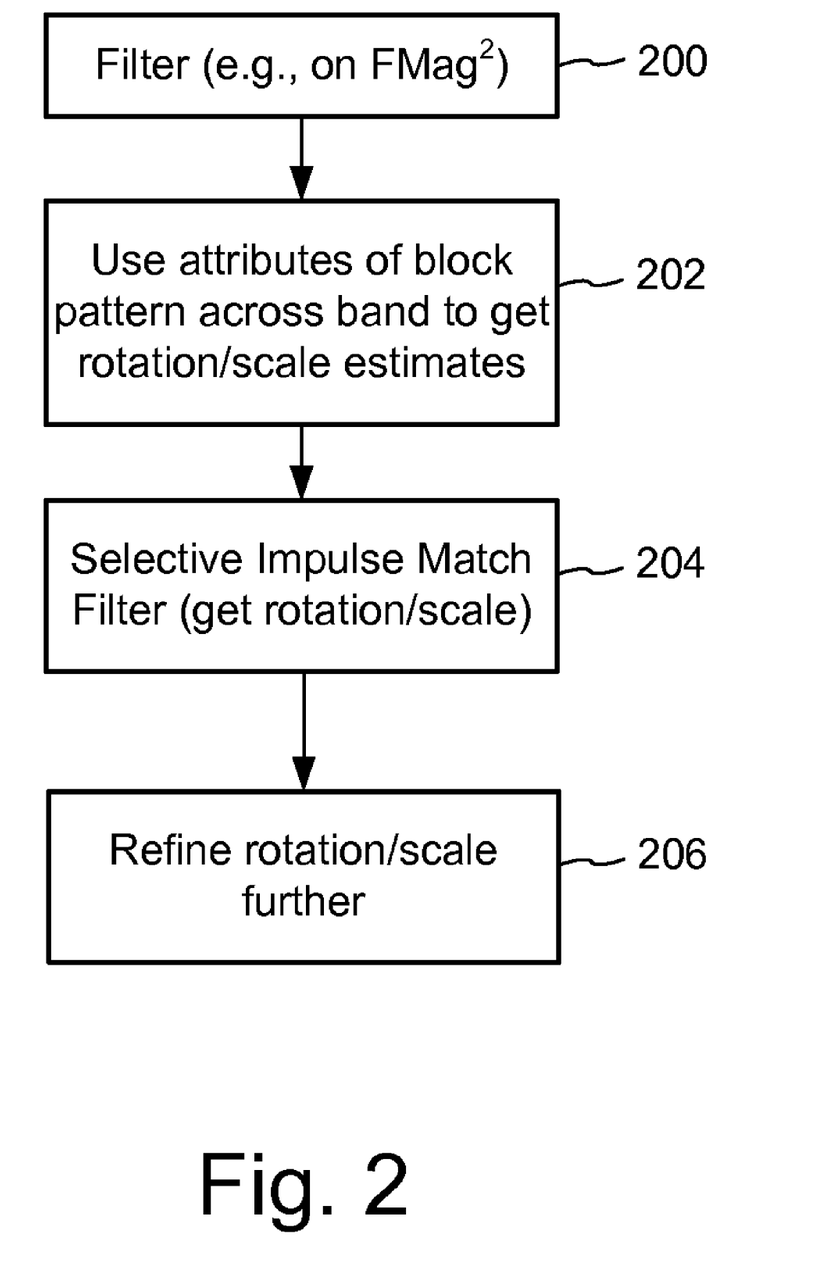
FIG. 2 is a block diagram illustrating a geometric registration stage of a digital watermark detector.

FIG. 2 is a block diagram illustrating a geometric registration stage of a digital watermark detector. The details of geometric registration are detailed in the patents incorporated above and in the digital watermarking literature. Thus, we begin the discussion assuming the reader has a familiarity with those techniques. There are two techniques that are generally related and relevant to this discussion. One technique relies on the patterning of watermark blocks in the embedding process so as to create transform domain peaks. Affine geometric transforms have a known effect on this pattern of peaks, which can be computed from detected peaks in the detector knowing the original pattern. Another related technique uses a fixed pattern of peaks in a frequency domain from which the affine transform is computed knowing the original pattern. Both of these techniques rely on the transform domain data computed in the previous detector stage. Both of these techniques can be used to approximate the rotation and scale of the image by correlating the detected pattern of peaks with a reference pattern. And finally, both of these techniques can be facilitated by performing the correlation in a log polar remapping of the data to extract rotation and scale parameters. However, to optimize detection, one technique can be used initially to get coarse approximates of the rotation/scale, and then the other can be used to get more detailed or accurate rotation/scale information.

FIG. 2 shows an example of one approach to geometric registration. First, the Fourier magnitude data (possible the square of the magnitude per above) is filtered to boost the watermark signal energy relative to the host image. For example, the detector filters the image data in a manner that replaces it with values representing a ratio of the Fourier magnitude values and their neighbors (200). Next, the detector analyzes the data to detect the repetition of the watermark blocks across the band, and thereby calculate a rough estimate of watermark rotation and scale (202). The pattern of the digital watermark blocks provides a discernable pattern in the transform domain from which an estimate of the digital watermark's rotation and scale can be derived. This estimate can then be used to limit subsequent processing by limiting the range or potential candidates over which the subsequent stages operate to detect the digital watermark and refine the rotation and scale estimates.

The detector then performs a selective impulse match filtering at specific portions of the Fourier magnitude data where energy peaks of the digital watermark are expected to be located (204). The processing is limited based on the initial estimates of rotation and based on the expected locations of the energy peaks of the digital watermark, which are fixed or otherwise known to the detector. This later calculation produces an estimate of the digital watermark's rotation and scale in the current image band. The detector then proceeds to refine the rotation/scale estimate further (206), optionally as described below.

Figure 3:
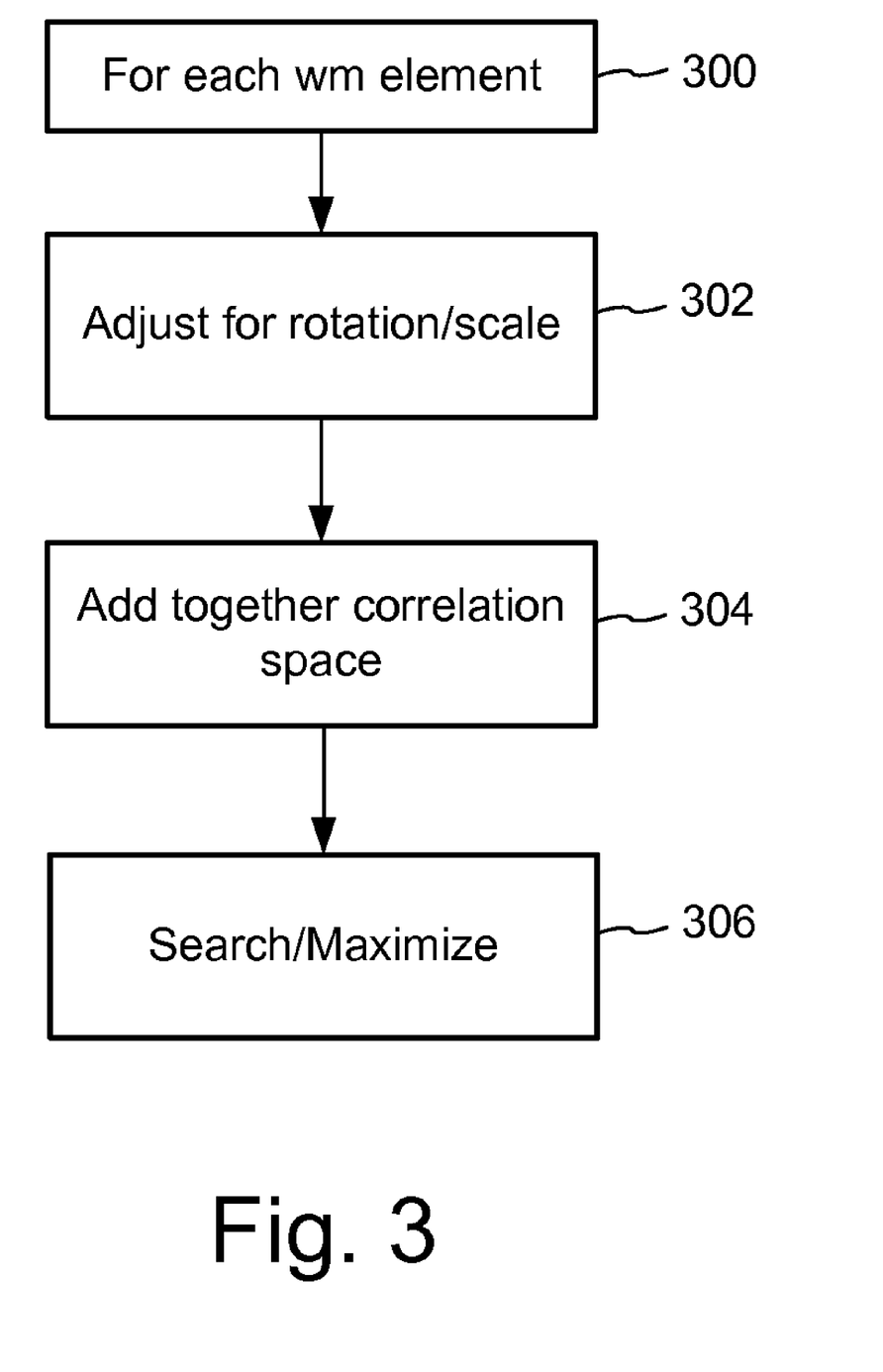
FIG. 3 is a block diagram illustrating a registration refinement stage of a digital watermark detector.

FIG. 3 is a block diagram illustrating a registration refinement stage of a digital watermark detector. At this stage, there are potentially several rotation and scale estimates associated with the detected digital watermark elements. To refine this estimate, one approach is to search in an N by N grid in the correlation space in a log polar coordinate system around each element to find the maximum correlation, and thus, the refined rotation and scale in the log polar coordinate system at which the digital watermark is located. However, this approach is computationally expensive because a number of searches are performed separately, possibly on each watermark element as well as each potential rotation and scale estimate (of which there may be several). An alternative approach is to combine the correlation space of all of the elements together to form a composite representation of correlation space of the entire array of watermark elements, and then evaluate this composite representation to refine the rotation and scale data.

One way to refine the rotation and scale data in this composite correlation space is to search for the maximum correlation peak iteratively. Each time selecting a possible rotation and scale refinement, interpolating the data, and testing whether a digital watermark has been found by one or more watermark detection criteria (e.g., correlation threshold, successful message extraction, etc.). Another way is to evaluate a maximize function to identify the point of maximum detection, which corresponds to the rotation and scale refinement that gives the highest detection result by one or more detection criteria (e.g., correlation, message accuracy, etc.).

Figure 4:
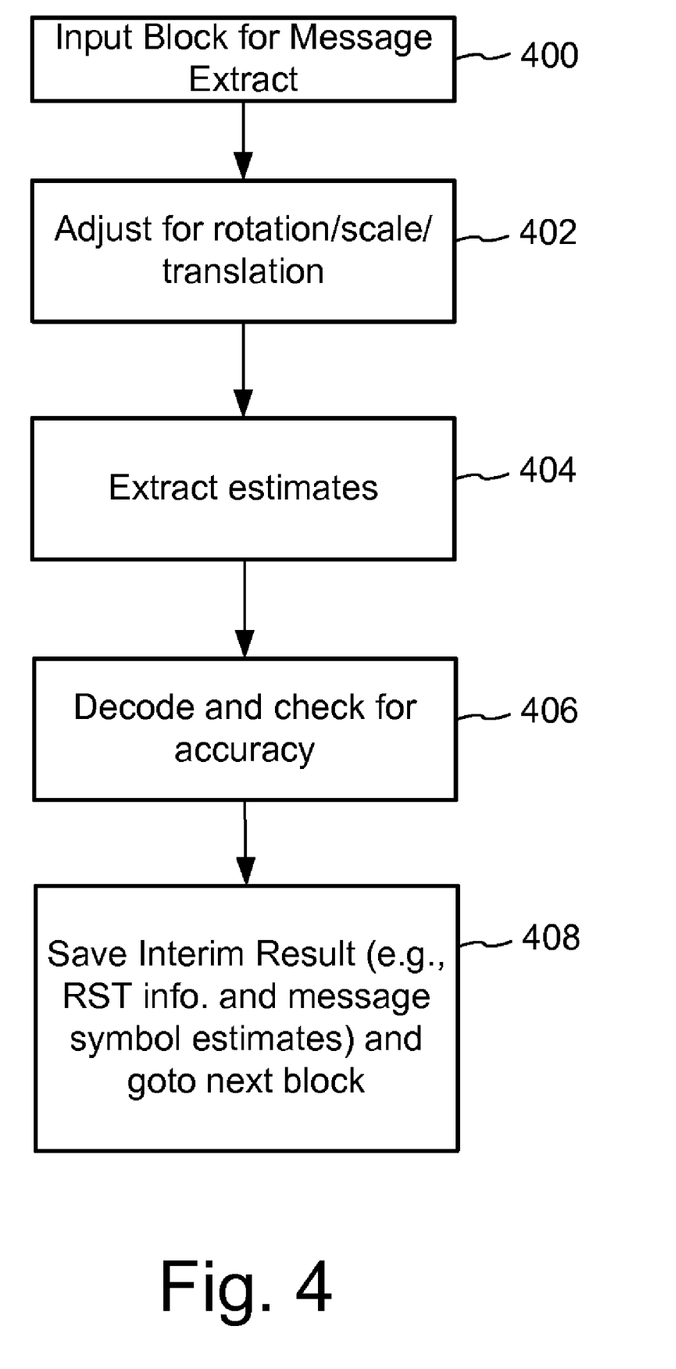
FIG. 4 is a block diagram illustrating a digital message extractor of a digital watermark detector.

FIG. 4 is a block diagram illustrating a digital message extractor of a digital watermark detector. The message extractor operates on blocks of image data that have been adjusted to compensate for geometric distortion (400, 402). The message reader extracts message estimates (e.g., by spread spectrum demodulation), which provides soft message elements. An error correction decoder then takes the soft message elements and performs error correction. The reader evaluates the resulting variable message data for accuracy by checking fixed message elements and/or error detection information. Further information on the details of decoding is provided in the patents incorporated by reference above, namely U.S. Pat. No. 6,614,914.

The results of the decoding for the block are re-used for other blocks. One form of re-use is using the rotation, scale and translation information for the current block for subsequent blocks to limit geometric registration processing for those subsequent blocks in cases where at least a partially successful message extraction occurs. Another form of re-use is accumulating the soft message elements across blocks, optionally weighting them based on detection criteria. The accumulated data can then be used in the error correction decoding stage to increase the chances of accurate message recovery.

Figure 5:
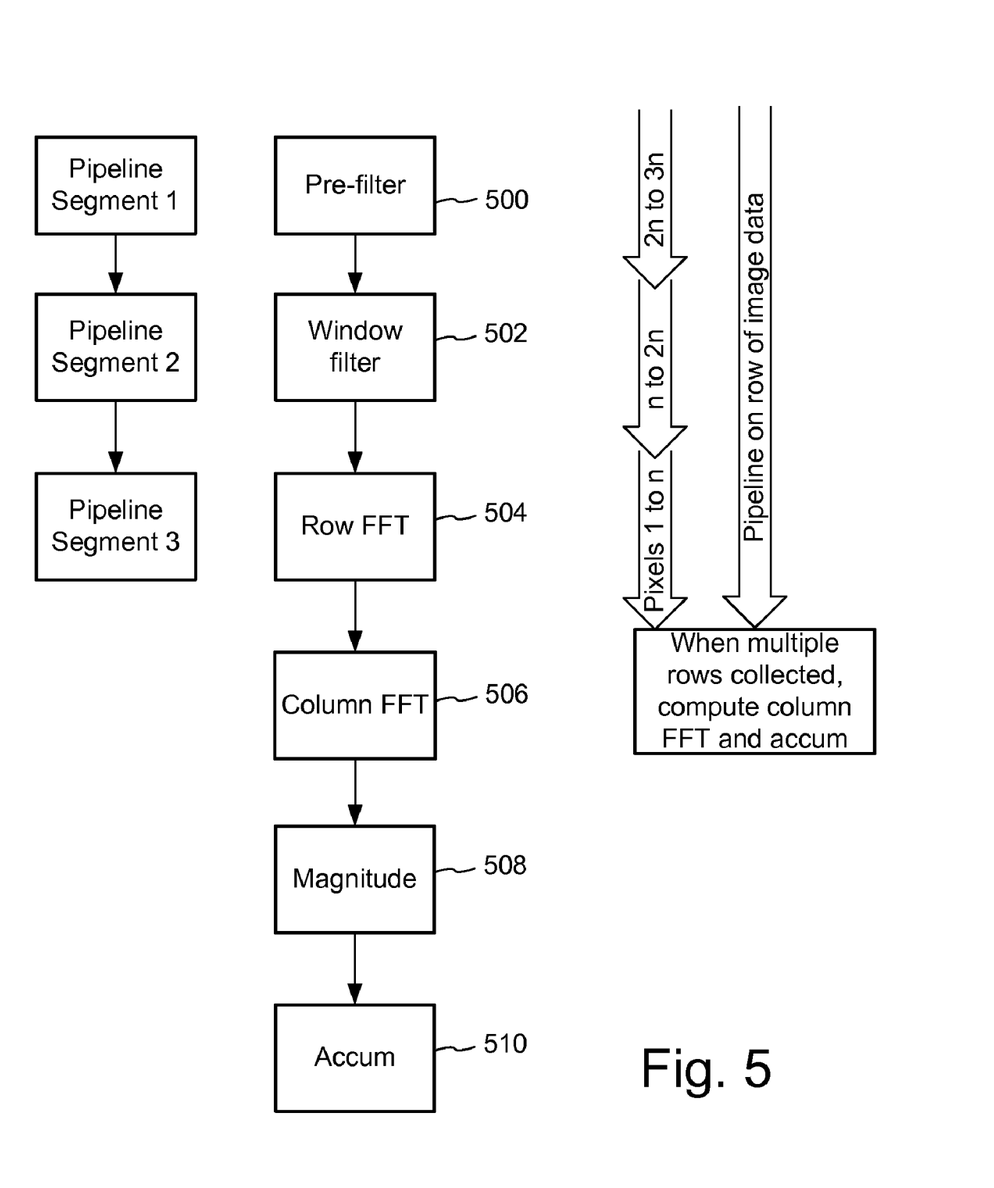
FIG. 5 is a block diagram illustrating a pipelined watermark processor.

FIG. 5 is a diagram illustrating a pipelined watermark processor. This pipelining approach is particularly well suited for implementation in digital hardware logic circuitry. In the context of a digital watermark detector, pipelining refers to implementing the detector in a series of pipelined segments that operate concurrently on segments of a block of data that flows in a stream to the detector. This pipelining works well in hardware and in contexts where the detector operates in streaming mode in which: 1. a block of data arrives in a continuous stream, 2. the block is available for a fixed period of time, and 3. the block is no longer available after the fixed period of time (e.g., is deleted or overwritten by the next block of data to arrive from the stream). One example, used to illustrate the approach, is a stream of image rows or bands as described previously. Other examples include streams of data blocks from image sensors or audio transducers (e.g., microphones).

In general, the pipeline model subdivides the watermark processor into processor segments as shown in the left of FIG. 5. A continuous stream of data flows into the processor segment. Each segment receives a segment of the data, processes it, and passes it to the next segment in a serial fashion without waiting for the entire block of data to arrive.

In a specific example shown in FIG. 5, pipeline segments are illustrated as functional blocks 500-504. The particular function of these detector segments is an example, and similar pipelining may be implemented for other detector stages described in this document. In this example, the detector operates on data segments, each segment comprising n contiguous pixels from a row of image pixels. As shown on the right side of FIG. 5, the data segments of n pixels flow through the pipeline in serial order from one processor segment to the next. Data segments within a row are processed concurrently within the pipeline as the segments flow through the pipeline stages.

Pre-filter 500 filters part of a row of pixels to prepare it for further detection. This filter can, itself, be pipelined into segments, such as a color space conversion segment, re-sample segment, spread energy filter segment, and prediction filter segment. Color space converter converts the data to a channel in which the watermark is embedded. Re-sampler transforms the data to a desired resolution. Spread energy filter serves as a predictor of the likelihood that the block includes energy characteristics consistent with a digital watermark (e.g., whether it likely includes a detectable/recoverable watermark). Finally, prediction filter provides an estimate or predictor of the watermark signal, or de-correlates the watermark from the host signal in which it is embedded. One such technique is to output for each pixel a function of a comparison of its value with neighboring values. This function may be implemented as a look up table.

In one embodiment, this prediction filter is a 2D filter operating on contiguous rows of pixels (e.g., a 3 by 3 pixel block, where each pixel is analyzed relative to its horizontal, vertical and diagonal neighbors). To accommodate this 2D filter operation, contiguous rows are accumulated and then the filter is applied across the rows. Pipeline stages are either designed to operate on groups of contiguous rows, or the prediction filter operates on a group of rows at a time, with subsequent stages pipelined for operation across individual rows.

Window filter 502 is used to deal with edge effects as a pre-process to an FFT segment 504. One example is a raised cosine filter that falls off at the edges of the data segment. It may be removed in cases where it does not materially enhance detection.

Row FFT 504 performs a 1-D FFT for the current data segment of n pixels. Since a 2D FFT is ultimately desired in this detector, the pipeline ends at this point to allow the results of the 1-D FFT for multiple rows to be accumulated in preparation for performing a column FFTs needed to complete the 2D FFT operation. Magnitude block 506 computes the Fourier magnitude, which is used for further watermark detector operations. While the spread energy filter in block 500 identifies data that is not likely to include a watermark, the pipeline processor continues to process each segment in the stream regardless of the outcome of this filter. At the end of the pipeline, the detector has a critical point where data that does not meet criteria for including a recoverable watermark is dropped from further processing (it can be dropped sooner if desired). This approach reduces further processing on such data and reduces false positives of watermark detection.

In this example, rows of pixels arrive in a streaming mode are available for watermark processing for a fixed period of time (e.g., before the subsequent bands in a stream overwrite the band buffer). Therefore, it is advantageous to accelerate watermark processing on them with pipelining. Other parts of the detector can be pipelined in a similar fashion, such as stages that perform similar transforms on data segments, such as mapping of the data to different coordinate spaces, correlation operations (e.g., matched filtering), etc.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A digital watermark detector comprising:
    a memory buffer configured to store an incoming stream of data;
    a registration module configured to determine registration of embedded data in blocks of the incoming stream of data; and
    logic configured to re-use the registration for subsequent blocks of the incoming stream of data to detect machine readable signals.

2. The digital watermark detector of claim 1, wherein the registration module detects signal peaks to determine the registration.

3. The digital watermark detector of claim 1, wherein the registration module detects a pattern of frequency components to determine the registration.

4. The digital watermark detector of claim 1, further comprising pipelined detector stages configured to perform pipelined processing of segments of data from the incoming stream of data.

5. The digital watermark detector of claim 1, wherein the incoming stream of data comprises a stream of video.

6. A digital watermark detector comprising:
    a memory buffer configured to store a block of data computed from a media signal; and
    pipelined watermark processor segments, wherein each of the segments is configured to perform a different watermark detector operation in series, and wherein the segments concurrently operate on different data segments of the block of data in a processing pipeline.

7. The digital watermark detector of claim 6, wherein the pipelined watermark processor segments perform a frequency domain transform on the block of data.

8. The digital watermark detector of claim 7, wherein the frequency domain transform comprises filtering and frequency domain transform stages.

9. The digital watermark detector of claim 6, wherein the pipelined watermark processor segments perform a 1-dimensional frequency domain transform.

10. A digital watermark detector comprising:
    a message reader configured to extract message estimates from blocks of media signal data;
    a memory configured to store the extracted message estimates; and
    a decoder configured to combine the extracted message estimates and decode a message from the combined message elements.

11. The digital watermark detector of claim 10, wherein the decoder combines the extracted message estimates by weighting the extracted message estimates based on detection criteria.

12. The digital watermark detector of claim 10, wherein the decoder combines the extracted message estimates based on registration data determined from one or more of the blocks of media signal data.

13. The digital watermark detector of claim 10, wherein the decoder combines the extracted message estimates based on a measure of message accuracy.

14. The digital watermark detector of claim 10, wherein the decoder combines the extracted message estimates based on a measure of correlation.

15. The digital watermark detector of claim 10, wherein the decoder combines the extracted message estimates selectively for a subset of the blocks of media signal data that satisfy detection criteria.

16. A method comprising:
    storing, in a memory of a computing device, an incoming stream of data;
    determining, by a processor of the computing device, a registration of embedded data in blocks of the incoming stream of data; and
    re-using the registration for subsequent blocks of the incoming stream of data to detect machine readable signals.

17. A tangible computer-readable medium having instructions stored thereon, the instructions comprising:
    instructions to store an incoming stream of data;
    instructions to determine a registration of embedded data in blocks of the incoming stream of data; and
    instructions to re-use the registration for subsequent blocks of the incoming stream of data to detect machine readable signals.

18. A method comprising:
    storing, in a memory of a computing device, a block of data computed from a media signal; and
    performing a different watermark detector operation in series using pipelined watermark processor segments of the computing device, wherein the segments concurrently operate on different data segments of the block of data in a processing pipeline.

19. A tangible computer-readable medium having instructions stored thereon, the instructions comprising:
    instructions to store a block of data computed from a media signal; and
    instructions to performing a different watermark detector operation in series using pipelined watermark processor segments, wherein the segments concurrently operate on different data segments of the block of data in a processing pipeline.

20. A method comprising:
    extracting, with a processor of a computing device, message estimates from blocks of media signal data;
    storing, in a memory of the computing device, the extracted message estimates; and
    combining the extracted message estimates and decoding a message from the combined message elements.

21. A tangible computer-readable medium having instructions stored thereon, the instructions comprising:
    instructions to extract message estimates from blocks of media signal data;
    instructions to store the extracted message estimates: and
    instructions to combine the extracted message estimates and decode a message from the combined message elements.

* * * * *

UNITED STATES PATENT AND TRADEMARK OFFICE
CERTIFICATE OF CORRECTION

| | | |
|---|---|---|
| PATENT NO. | : 7,957,552 B2 | Page 1 of 1 |
| APPLICATION NO. | : 12/356489 | |
| DATED | : June 7, 2011 | |
| INVENTOR(S) | : Gustafson et al. | |

It is certified that error appears in the above-identified patent and that said Letters Patent is hereby corrected as shown below:

Column 1, line 8, delete "continuation in part" and insert -- continuation-in-part --.

Column 10, line 61, in Claim 21, delete "estimates:" and insert -- estimates; --.

Signed and Sealed this
Thirteenth Day of September, 2011

David J. Kappos
*Director of the United States Patent and Trademark Office*